United States Patent [19]

Wise

[11] Patent Number: 4,946,588
[45] Date of Patent: Aug. 7, 1990

[54] FLUID TREATMENT OR MONITORING ASSEMBLIES

[76] Inventor: John R. Wise, Cotswold Pulborough Rd., Cootham, Storrington, West Sussex, United Kingdom

[21] Appl. No.: 242,621

[22] Filed: Sep. 12, 1988

[30] Foreign Application Priority Data

Sep. 10, 1987 [GB] United Kingdom ............... 8721308

[51] Int. Cl.⁵ .............................................. B01D 35/14
[52] U.S. Cl. .................................... 210/85; 210/232; 210/323.2; 210/453; 210/541
[58] Field of Search ................. 210/85, 232, 234, 235, 210/244, 245, 323.2, 453, 541

[56] References Cited

U.S. PATENT DOCUMENTS

| 1,840,883 | 1/1932 | Brecher | 210/232 |
|---|---|---|---|
| 2,709,525 | 5/1955 | Beyer et al. | 210/232 |
| 2,889,933 | 6/1959 | Brunday | 210/323.2 |
| 3,019,904 | 2/1962 | Stecher | 210/232 |
| 3,118,837 | 1/1964 | Briggs | 210/232 |
| 3,279,608 | 10/1966 | Soriente et al. | 210/232 |
| 3,317,048 | 5/1967 | Kasten | 210/234 |
| 4,513,606 | 4/1985 | Rhynard | 210/85 |

FOREIGN PATENT DOCUMENTS 2132499 7/1984 United Kingdom .

Primary Examiner—Peter Hruskoci
Assistant Examiner—Christopher Upton
Attorney, Agent, or Firm—Young & Thompson

[57] ABSTRACT

A fluid treatment or monitoring assembly has a number of elongate, parallel elements (7) such as filters mounted in a closed vessel (1). Each element (7) is held in place by an individual spring-loaded locator (15) bearing down on one end, holding its other end against a seat. The locators are mounted on a common plate (16) which is secured by screw rods (12) parallel to the filters. Each rod (12) carries a projection (20) and as it is rotated the projection engages any locator (15) that is not properly retaining a filter element (7), thus preventing completion of the assembly. But if all the filter elements are present and properly located, the rods (12) can be fully screwed down. In addition, the vessel cover (2) may be impossible to fit unless all the rods (12) are screwed down.

8 Claims, 2 Drawing Sheets

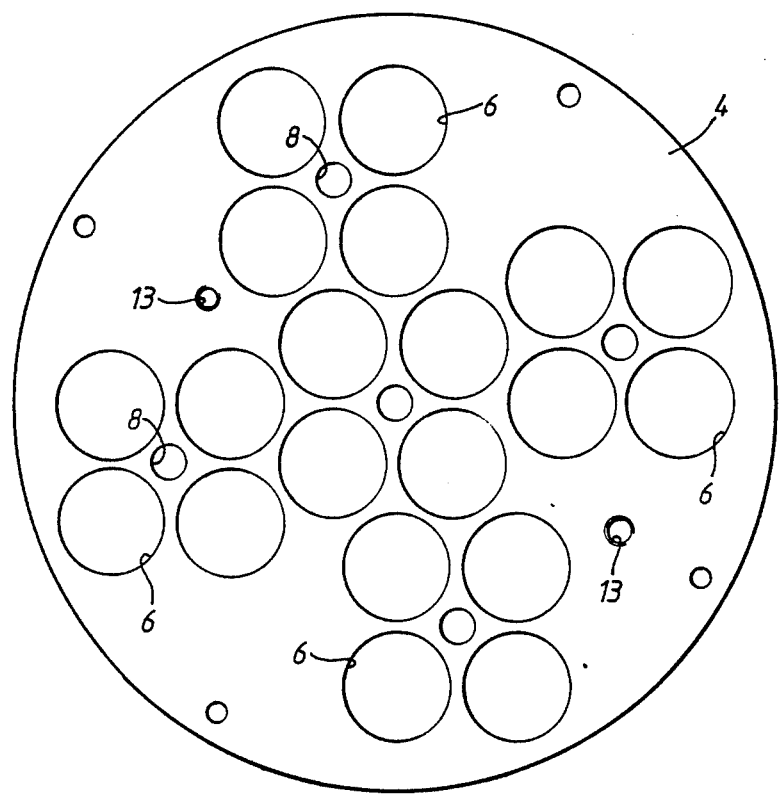

FLUID TREATMENT OR MONITORING ASSEMBLIES

This invention relates to fluid treatment or monitoring assemblies. It is primarily concerned with those in which there is parallel fluid flow through a plurality of elements mounted in a common housing. Such as assembly is described in GB No. 2,132,499B, for example, which concerns a filtration system.

It is explained in that earlier patent that it is necessary to have a poppet valve that will close off the inlet to any filter element should that element not in fact be present. With a large number of such elements it is not unknown for one or two to be omitted accidentally. Such a measure will prevent flow of unfiltered fluid directly to the clean fluid outlet, but the arrangement entails encasing each filter element in a tube and providing a poppet valve, which is complicated and expensive. In other systems in common use, costly check valves that rely on close tolerances to operate are employed. These have been known to stick in open positions and when dealing with aircraft fuel, for example, they are potentially lethal.

It is the aim of this invention to simplify the structure and to avoid such valves, relying instead on security measures that make it virtually impossible to operate with a less than complete complement of filter or other treatment or monitoring elements.

According to the present invention there is provided a fluid treatment or monitoring assembly having a plurality of elements through which fluid is to flow mounted in a closed vessel, wherein retaining means for the elements have individual locators, each of which, when fully engaging and locating an associated element, has a first position and, when not so engaging, has a second position, and wherein means for securing the retaining means within the vessel are rendered inoperative when any locator is in said second position.

The elements will generally be elongate and arranged in parallel. The locators may be spring-biased towards their second positions and each may be arranged to engage one end of an associated element, urging the latter lenghtwise against a seat at the opposite end while being shifted to its first position.

The locators are conveniently carried by a common member. The securing means preferably include rods with screw fastening, the rods passing through the common member and extending parallel to the elements. Each rod may carry a projection that turns with it. When an adjacent locator is in the first position, the associated projection can rotate freely past it, but when it is in the second position the projection engages it and prevents the screw fastening. This projection may be slidable on the rod, normally to rest on the common member. Each locator will then have a part in the path of an adjacent projection when in said second position but which is raised clear of said path when in said first position. The lower ends of the rod may engage a plate through which the elements extend, and this may simply be bolted to lugs welded or otherwise fixed to the inside of the vessel wall.

Closure of the vessel may be be a cover above the retaining means, and the cover fitting may be impeded by the securing means unless the latter are in the operative position. This may be caused by any of the rods not being screwed fully into place, which will be the case if any element is missing.

In one preferred form the elements are filters, and in the following the invention will be explained in terms of a filtration system.

The arrangement lends itself to quite easy conversion of vessels with existing more complicated and unreliable treatment or monitoring assemblies. The check valves, encasing tubes and associated items can be removed and, after welding on the necessary lugs, the present assembly can be rapidly fitted. The original size elements may be retained.

For a better understanding of the invention, one embodiment will now be described, by way of example, with reference to the accompanying drawings, in which:

FIG. 2 is a plan view of a cam as used in that vessel, and

FIG. 3 is a plan view of a location plate as used in that vessel.

Figure 1:
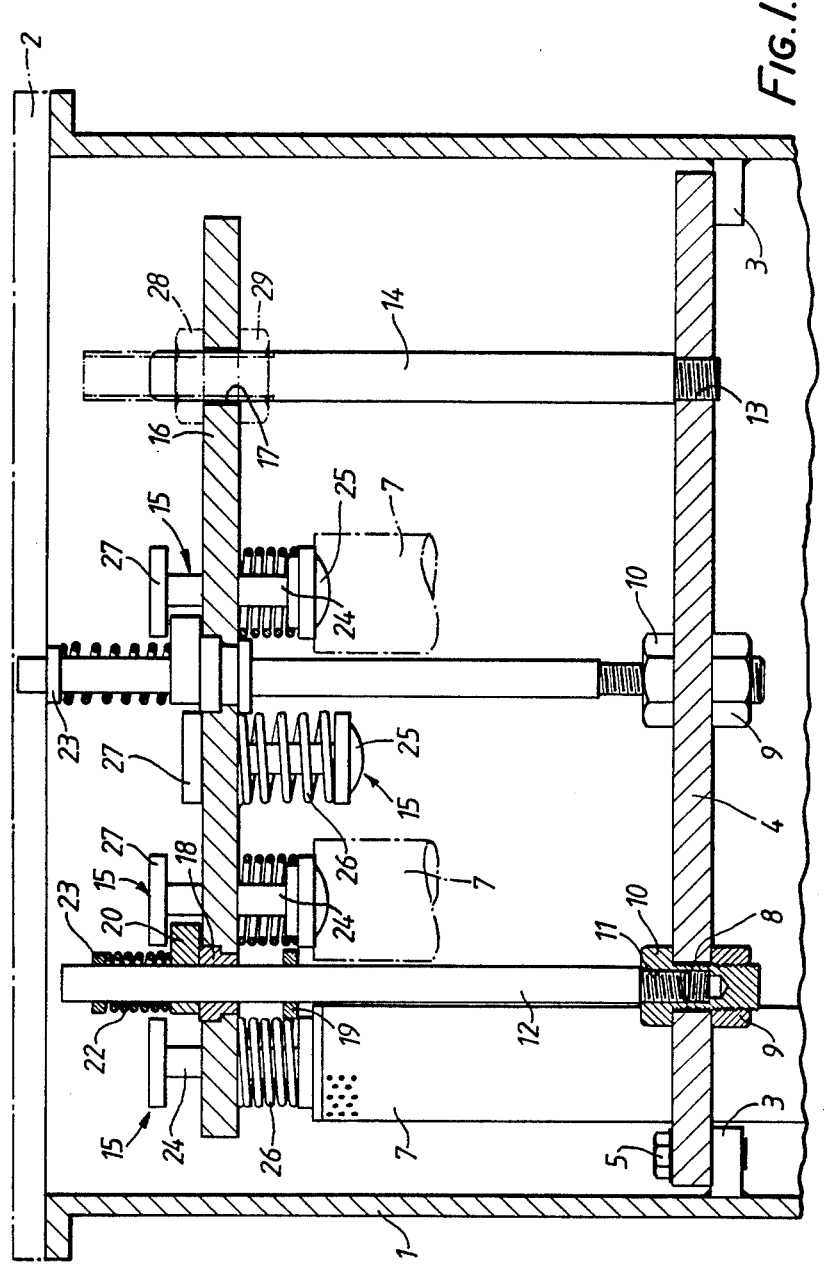
FIG. 1 is a vertical section through part of a filtration vessel.

The vessel is cylindrical, with its axis vertical, and it has a main body 1 with a door or cover 2 at its upper end. The lower end is not shown, but the filter elements to be described extend down towards that end where they deliver the filtered fluid.

A set of lugs 3 with screw-threaded holes is welded to the inside of the cylindrical wall of the body 1, all at the same height and circumferentially evenly spaced. A circular plate 4 rests on these lugs and is firmly secured thereto by bolts 5. This plate has a multitude of apertures, as best seen in FIG. 3, and the larger ones 6 are for receiving and locating cylindrical filter elements 7. The apertures 6 are in square groups of four, and in the centre of each group there is a smaller aperture 8. On the underside of the plate 4 nuts 9 are welded in registry with the apertures 8, to receive bolts 10. The latter are themselves drilled and tapped at 11, each to receive the screw-threaded lower end of an otherwise square section spindle 12. There are two further holes 13 at diametrically opposed points in the plate 4 which screw-threadedly receive the lower ends of vertical pillars 14.

The upper ends of the filter elements 7 are kept in place by respective locators 15 carried by a plate 16 parallel to the plate 4. This is apertured at 17 to mate with the pillars 14, and has rotatable bushes 18 at points directly over the apertures 8. The spindles 12 extend through correspondingly square apertures in the bushes 18 and below the plate 16 they carry fixed collars 19. Above the plate 16 they each have a cam 20 urged downwardly by a spring 22 reacting against another fixed collar 23. The cam, shown in plan in FIG. 2, will rotate with the spindle 12 while being capable of relative axial movement.

Each filter locator 15 is generally dumb-bell shaped with a shaft 24 that can slide vertically through a corresponding hole in the plate 16. The lower end part 25 is domed to locate within and abut against the upper end of a filter element 7, and a spring 26 acting between that part 25 and the underside of the plate 16 urges the locator downwards, this movement being limited by its head 27 engaging the top of the plate 16 when no filter is engaged. But when the plate 16 is fitted and a locator 15 is holding the filter in position, the spring 26 is compressed and the head 27 is spaced above the plate 16 by a distance greater than the thickness of the cam 20.

On assembly, or when replacing one or more filter elements, the plate 16 carrying the spindles 12 and locators 15 is positioned after all the filters are in place (or at least after they are all thought to be in place). As mentioned previously, with a great number, one or two may be omitted. As the plate 16 is dropped over the locating pillars 14, the lower ends of the spindles 12 find the threaded holes 11, while the locator parts 25 engage the upper ends of the filter elements 7. The plate 16 is then pressed down, and wherever there are filters, the locators 15 are held so that their heads 27 rise relative to the plate 16. When any group of four heads rise, the associated cam 20 is free to rotate as the spindle 12 is tightened down into the bolt 10. As this proceeds, the cam slides towards the collar 23, compressing the spring 22.

However, should there be a missing filter, the associated locator head 27 will remain hard down against the plate 16, and when the associated spindle 12 is turned, the cam 20 will come up against this and it will not be possible to turn it further. This alone should be a sufficient indication to the fitter that something is wrong, but as a further safeguard the spacing of the lugs 3 from the cover 2, when the latter is properly fixed, is critically related to the length of the securing spindles 12. This means that if the spindle 12 is not fully screwed down, its upper end will interfere with the fitting of the cover 2, as indicated at the centre of FIG. 1. Not being able to fit the cover is a further signal that the assembly as a whole cannot be put into operation.

The initial pressing down of the plate 16 may not be possible by hand when there are a large number of filters: the resistance of a correspondingly large number of springs 26 has to be overcome. A solution to this is simply to have the pillars 14 extended and screw-threaded at their upper ends, as indicated in outline in FIG. 1 and to apply nuts 28. As these are tightened down, so the plate 16 is forced down, and it may finally locate against collars or pre-fitted nuts 29 on the pillars 14.

It will be understood that there can be many different numbers and arrangements of the apertures 6 and associated filters 7, and they need not be in the square groups of four shown.

I claim:

1. An assembly for mounting a plurality of elements through which fluid is to flow in a closed vessel, the assembly comprising a first structure for carrying said elements in an ordered array, a second structure carrying a correspondingly ordered array of spring-loaded locators having an original position and being constructed and arranged to be movable into a second position wherein each locator is moved against its spring loading by an associated said element if said element is present, means for securing said second structure in said second position, wherein the absence of any said element allows the associated said locator to remain in its original position in relation to the second structure, said locators having means to impede complete operation of said securing means when any said locator is in its said original position.

2. An assembly as claimed in claim 1, wherein the elements are elongate and arranged in parallel.

3. As assembly as claimed in claim 1, wherein the elements are filters.

4. An assembly as claimed in claim 1, wherein there is a corresponding ordered array of seats within the vessel and wherein each locator is arranged to engage one end of an associated element and to urge that element lengthwise against one of said seats at an opposite end of said element.

5. An assembly as claimed in claim 1, wherein the securing means includes rods with screw fastening, the rods passing through the first structure and extending parallel to the elements, each rod carrying a projection that turns with the rod, and wherein when an adjacent locator is in its second position, the associated projection can rotate freely past that locator, but when that locator is in its original position the projection engages that locator and prevents the screw from fastening.

6. As assembly as claimed in claim 5, wherein the projection is slidable on the rod, normally to rest on said first structure, each locator having a part in the path of an adjacent projection when in said original position but which is shifted clear of said path when in said second position.

7. An assembly as claimed in claim 5, wherein the ends of the rods remote from the first structure engage, by means of said screw fastening, a plate fixed to the vessel and through which the elements extend.

8. An assembly as claimed in claim 1, wherein closure of the vessel is by a cover above said first structure, the securing means also extending above said first structure and being constructed and arranged such that, until said complete operation is effected, said securing means provide an impediment to fitting of the cover.

* * * * *